(12) United States Patent
Kaufmann et al.

(10) Patent No.: US 9,587,598 B2
(45) Date of Patent: Mar. 7, 2017

(54) FILTER HOUSING AND FILTER ASSEMBLY

(71) Applicant: MANN+HUMMEL GMBH, Ludwigsburg (DE)

(72) Inventors: Michael Kaufmann, Meckenheim (DE); Klaus-Dieter Ruhland, Meckenheim (DE); Karlheinz Muenkel, Oberderdingen-Flehingen (DE); Manfred Winter, Bad Rappenau (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 125 days.

(21) Appl. No.: 14/567,976

(22) Filed: Dec. 11, 2014

(65) Prior Publication Data

US 2015/0176544 A1 Jun. 25, 2015

(30) Foreign Application Priority Data

Dec. 12, 2013 (DE) .......................... 10 2013 020 540

(51) Int. Cl.
*B01D 46/00* (2006.01)
*B01D 45/16* (2006.01)
*F02M 35/024* (2006.01)
*B01D 45/12* (2006.01)
*B01D 50/00* (2006.01)
*F02M 35/02* (2006.01)

(52) U.S. Cl.
CPC ....... *F02M 35/02416* (2013.01); *B01D 45/12* (2013.01); *B01D 46/0002* (2013.01); *B01D 46/0005* (2013.01); *B01D 46/0023* (2013.01); *B01D 46/0045* (2013.01); *B01D 50/002* (2013.01); *B01D 2265/021* (2013.01); *F02M 35/0214* (2013.01); *F02M 35/0216* (2013.01)

(58) Field of Classification Search
CPC .............. B01D 46/002; B01D 46/0002; B01D 46/0023; B01D 46/0004; B01D 46/0005; B01D 46/0021; B01D 46/00; B01D 45/16; F02M 35/02416; F02M 35/02491
USPC .... 55/385.3, 498, 502, 309, 337; 123/198 E; 210/232
See application file for complete search history.

(56) References Cited

U.S. PATENT DOCUMENTS

| 4,861,359 A | 8/1989 | Tettman |
| 6,263,850 B1 | 7/2001 | Winmill et al. |
| 6,419,718 B1 | 7/2002 | Klug et al. |
| 6,568,540 B1 | 5/2003 | Holzmann et al. |

(Continued)

FOREIGN PATENT DOCUMENTS

| DE | 2630875 A1 | 1/1978 |
| DE | 3705951 C1 | 3/1988 |
| EP | 0534079 A2 | 3/1993 |

*Primary Examiner* — Jacob T Minskey
*Assistant Examiner* — Minh-Chau Pham
(74) *Attorney, Agent, or Firm* — James Hasselbeck

(57) ABSTRACT

A filter housing for receiving a filter element is provided with a first housing part having a first housing opening and a second housing opening. A second housing part is connected to the first housing part. A first connecting socket is arranged at the first housing opening of the first housing part. A second connecting socket is arranged at the second housing opening of the first housing part. A receiving space is provided in an interior of the filter housing between the first and second housing openings, wherein the receiving space accommodates the filter element.

23 Claims, 6 Drawing Sheets

(56) References Cited

U.S. PATENT DOCUMENTS

| | | | |
|---|---|---|---|
| 6,881,238 B2* | 4/2005 | Marchart | B01D 46/0002 123/198 E |
| 7,041,146 B2* | 5/2006 | Bugli | B01D 46/0023 123/198 E |
| 7,625,419 B2 | 12/2009 | Nelson et al. | |
| 7,799,108 B2* | 9/2010 | Connor | B01D 46/002 123/198 E |
| 8,163,057 B2* | 4/2012 | Blossey | B01D 46/0004 123/198 E |
| 8,262,759 B2* | 9/2012 | Amesoeder | B01D 46/002 55/309 |
| 8,394,158 B2* | 3/2013 | Shimomura | F02M 35/0203 55/385.3 |
| 8,496,723 B2* | 7/2013 | Reichter | B01D 46/0005 55/385.3 |
| 8,784,527 B2* | 7/2014 | Jung | F02M 35/02416 123/198 E |
| 8,876,931 B2* | 11/2014 | Braithwaite | B01D 46/2411 210/232 |
| 2008/0276582 A1 | 11/2008 | Boehrs et al. | |
| 2008/0307759 A1 | 12/2008 | Reichter et al. | |
| 2012/0073252 A1* | 3/2012 | Lee | F02M 35/02491 55/385.3 |
| 2013/0255203 A1* | 10/2013 | Muenkel | B01D 46/0021 55/337 |

* cited by examiner

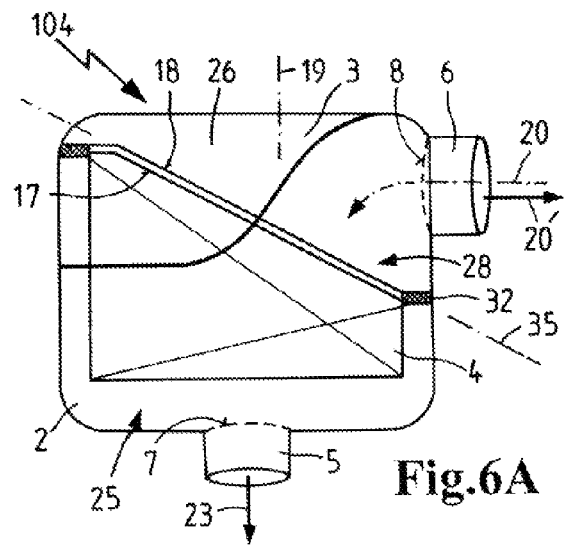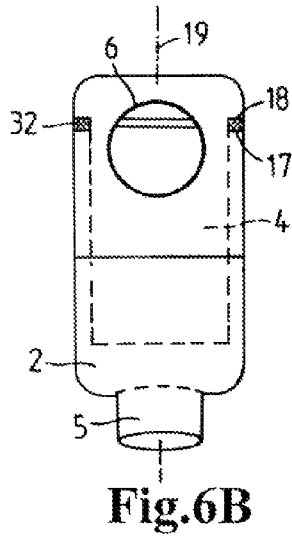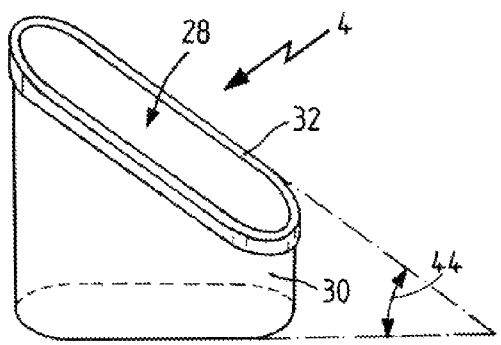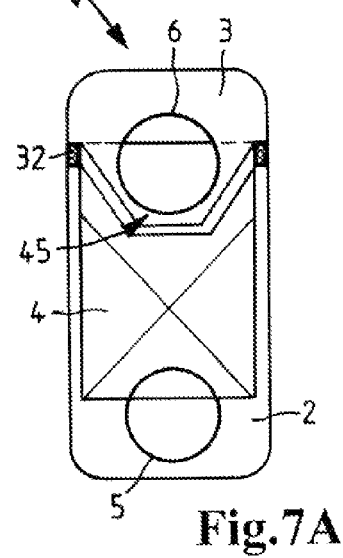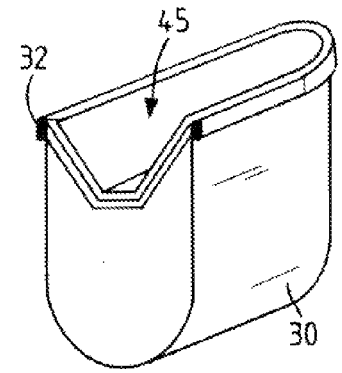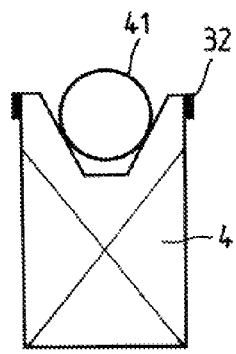

FILTER HOUSING AND FILTER ASSEMBLY

BACKGROUND OF THE INVENTION

The present invention concerns a filter housing and a filter assembly, in particular an air filter housing and an air filter assembly.

Air filters are used, for example, as intake air filters for motor vehicles so that dirt particles are removed from the combustion air for the respective motor. In this context. it is desirable to provide air filters and their housing in a space-saving way in or on the vehicle. Filtration is carried out generally by filter elements that comprise suitable filter media and that are flowed through by the combustion air to be purified.

Air filter elements are generally secured in two-part housings of a cover element and a housing bottom part each provided with a connecting socket for clean air or raw air. The filter element is then provided laterally sealed on the housing between the connecting sockets and is flowed through by the air. WO2006/012386 discloses such filter assemblies. Removal and optionally an exchange of the air filter element out of and into the housing is realized in this context along the flow-through direction of the air.

EP 2 024 631 B1 discloses an air filter housing with a housing bottom part and a cover element wherein an air filter element is insertable with a significant portion of its length into the housing bottom part. On the housing bottom part, a deflecting connecting socket for the side of the air filter element that is facing the cover element is provided wherein the deflecting connecting socket is integrally formed on a collar of the housing bottom part. In this context, the deflecting connecting socket is provided on the housing bottom part outside of the cross-section covered laterally by the air filter element.

SUMMARY OF THE INVENTION

In view of this background, the present invention has the object to provide an improved filter housing and/or an improved filter assembly.

Accordingly, a filter housing is provided which is suitable for receiving a filter element. The filter housing comprises a first housing part and a second housing part as well as at least two connecting sockets which are each arranged on a housing opening of the first housing part. In this context, the filter element is secured in the filter housing in a space between the two housing openings.

The two connecting sockets which can be used as inlet and outlet for the filter housing are provided on only one housing part. In this way, it is possible to perform a filter element exchange without having to remove supply lines on the connecting sockets. For example, upon exchange of the filter element only the second housing part is removed from the filter housing so that the filter element is removable. The first housing part can be a housing bottom part and the second housing part a cover element.

The filter housing is in particular an air filter housing for receiving an air filter element for filtration of combustion air for an internal combustion engine in a motor vehicle. The housing serves preferably for use in tight space conditions, for example, in the engine compartment of automobiles but also in or on commercial vehicles.

In embodiments, one of the housing openings of the first housing part and/or one of the connecting sockets is arranged at least partially outside of a projection of the filter element along its longitudinal direction.

The provided flow-through direction of the fluid to be purified can be understood as longitudinal direction. For example, the longitudinal direction of the filter element or also of the filter housing can be considered to extend along the pressure difference or the pressure drop of the fluid or of the air upon flow-through. It can be said that the filter element is flowed through along its longitudinal direction and extends transversely thereto. The filter element thus has a cross-sectional surface area, for example, at its inflow side and outflow side. When now at the inflow side the cross-sectional surface area of the filter element is extended in the direction toward the housing, at least one connecting socket or a correlated housing opening is outside of this projection.

Moreover, the filter housing can be configured such that one of the housing openings of the first housing part and/or one of the connecting sockets is arranged at least partially outside of a lateral projection of the filter element. It can be said that the housing openings generally are not provided on the housing at locations where the filter element extends longitudinally.

In embodiments, the first housing part is configured such that an inserted filter element is completely guidable along its longitudinal direction out of a receiving area of the filter housing. For example, the filter element can be removed along the longitudinal direction from the housing. In this context, preferably no impairment occurs by the housing parts that in principle can be shaped irregularly. For example, the second housing part or a cover element can be lifted directly off the first housing part such that a space in accordance with the length of the filter element becomes accessible.

In embodiments of the filter housing, the first connecting socket and the second connecting socket each have a preferred direction pointing away from the housing openings of the first housing part. The preferred directions are positioned at an angle of less than 180° relative to each other. This means that the preferred directions are not provided co-linear or axially opposed on the housing parts.

Preferably, the preferred directions are positioned at an angle of less than 90° relative to each other. Particularly preferred, the preferred directions are substantially pointing in the same direction. For example, an angle range of less than 10° at which the preferred directions are positioned relative to each other is still to be understood as pointing in the same direction. For example, the two connecting sockets point away from the housing substantially in the same direction. Accordingly, a hose connection can be extended to the socket particularly easily and in a space-saving way.

In embodiments, at least one of the connecting sockets is attached to the respective housing opening. The socket can be in particular fused or glued on. Conceivable is also a material-monolithic embodiment of connecting socket and housing member. It is possible to provide one or the connecting sockets with reinforcement elements, for example, reinforcement ribs, metal inserts, metal-reinforced or fiber-glass-reinforced sections and/or reinforcement inserts. The stress caused by attaching or removing supply or removal lines to or from the connecting sockets can lead to material fatigue so that the reinforcement elements counteract breakage.

In embodiments, on at least one connecting socket flow guiding elements are attached. Flow guiding elements cause an improved flow through the filter element provided within the filter housing. The guiding elements can be, for example, baffle plates, relief-like portions, winglets or the like in the connecting socket.

In embodiments, the filter housing is produced by an injection molding process.

In embodiments, the second housing part comprises a housing opening which corresponds with one of the housing openings of the first housing part. In this way, it is possible to stationarily provide the two connecting sockets exclusively on the second housing part. It is also possible to provide further housing openings in the second housing part which correspond with housing openings of the first housing part.

In embodiments, the first and/or the second housing part is provided with positioning elements for the filter element in an area of a sealing plane which separates a raw fluid area from a clean fluid area. Positioning elements facilitate insertion of the filter element that, for example, comprises corresponding cutouts or projections for the positioning elements on the housing.

In embodiments, the filter element is integrated into the first and/or second housing part. For example, a holding frame for a filter body surrounding the inflow side of the filter element is a component of the first or second housing part. By a fixed connection between the housing part and the filter element in particular at the raw air side, it can be avoided that filtered particles pass into the further air intake manifold for clean air when exchanging the filter element.

The filter housing may comprise in embodiments in particular in or on the first or second housing part at least one support element for engagement of a corresponding support section of the filter element. The support element extends, for example, in the direction toward an outflow side of the filter element and counteracts bending of the filter body as a result of flow resistance. The support element can be in particular elastically deformable so that vibrations of the filter element can be reduced or dampened.

A support element extends, for example, from a housing wall in longitudinal direction toward an outflow side of the filter element.

In embodiments, the filter element is designed so that it can be coupled with at least one further filter device. The further filter device can be, for example, a preseparation device in order to achieve a coarse prefiltration.

In embodiments, the further filter device is designed in or on one of the connecting sockets as a preseparation device. An integration of the preseparation device in the connecting socket is particularly space-saving. Due to the connecting sockets being stationarily arranged after installation of the housing bottom part, a preseparator can be provided beneficially and in a space-saving way adjacent to the housing.

As an alternative or in addition, the filter housing can comprise the further filter device as a preseparator which is provided in or on one of the housing parts. It is in particular conceivable that the filter housing comprises a third housing part which is provided between the first and the second housing part. The third housing part can be suitable for receiving the further filter device, such as a preseparation device.

Moreover, a filter element, in particular an air filter element, is proposed for use in an appropriate filter housing as described above.

Moreover, a filter assembly is proposed comprising a filter housing as afore described and a filter element which, in properly mounted state, separates a raw fluid area from a clean fluid area.

In this context, the filter element is fluid-tightly sealed, for example, laterally relative to the housing wall.

In embodiments, the filter element is detachably attached to the second housing part. In embodiments, the second housing part is a removable cover element which is removable together with the filter element from the first housing part as a housing bottom part. In a flow guiding action in which raw fluid enters the second housing part, flows through the filter element, and is blown out by a connecting socket at the first housing part, it is prevented that filtered dirt particles upon exchange can pass into the clean fluid area. It is in particular conceivable that the first housing part comprises a further housing opening and a further connecting socket which is suitable as a dust discharge. It is advantageous that, when opening the housing, the connecting sockets remain substantially stationary and therefore connecting lines or hoses can stay attached.

The filter assembly can be furnished furthermore with a preseparation device that is arranged upstream of the filter element. A preseparation device, for removal of coarse dirt particles from the raw fluid, can be provided, for example, outside of the filter housing. In particular, a lateral arrangement is possible due to the positioning of the outer connecting sockets.

In embodiments, the preseparation device comprises at least one centrifugal separator. Centrifugal separators or cyclone separators accelerate incoming fluid in a spiral shape such that, as a result of the centrifugal forces, particles remain on the exterior wall of the cyclone tube and, as a result of the force of gravity, pass to a discharge window where they can be discharged.

In embodiments of the filter assembly, the filter housing comprises at least one support element and the filter element comprises a support section corresponding with the support element. Support elements extend from one housing wall in the direction toward the filter element and stabilize, for example, the filter medium being flowed through. By means of support elements, vibrations that may be generated at the vehicle can be reduced.

In embodiments, the filter housing comprises positioning elements for the filter element in an area of a sealing plane which separates the raw fluid area from the clean fluid area. The filter element then comprises positioning sections that correspond with the positioning elements.

The positioning elements predetermine in particular contours or shapes for certain areas of the filter element so that, on the one hand, only the intended filter elements can be inserted into the assembly and, on the other hand, a position that is beneficial for filtration is achieved. Filter elements with positioning sections, for example, cutouts or projections, that do not correspond appropriately, then cannot be inserted into the filter assembly. For example, closing of the filter housing is prevented by faulty positioning of positioning elements and positioning sections.

In embodiments of the filter assembly, the filter element has a slanted inflow side relative to the outflow side. Often, filter elements with a flat inflow side and a flat outflow side are manufactured. Usually, the two sides extend parallel to each other. By configuring the planes defined by the inflow side and outflow side so as to be slanted relative to each other, the available space in the filter housing can be used better. Accordingly, as a whole, a greater filter surface area is provided. Moreover, preseparating devices can be provided along or opposite to the inflow side.

In embodiments of the filter assembly, the filter element has a cutout on the filter body for receiving at least partially a cylindrical preseparator which extends from one of the connecting sockets into the interior of the filter housing.

In principle, the filter element can comprise a cutout in the filter body for at least partially receiving a secondary filter element and/or preseparator.

The filter element, for example, can comprise a cutout of the filter body in which parts of the volume of a secondary filter element is accommodated in the intended assembled state of the filter assembly. Secondary filter elements serve to further improve filtration and can be arranged downstream of the main filter element.

Embodiments of the filter assembly provide that a secondary filter element and the filter element are attached to each other. With a detachable or non-detachable attachment, vibrations can be reduced that may occur due to the additional filter element in the housing. The main filter element and secondary filter element correspond with regard to their geometry preferably such that a well-defined positioning in the filter housing is realized.

In embodiments, the filter assembly has a sealing device that seals fluid-tightly the secondary element laterally relative to a housing wall. A sealing device or a sealing element can be injection-molded, glued or attached in other ways to a housing wall. The sealing device can also be arranged on the main filter element or secondary filter element, for example, on a frame.

In embodiments, the sealing element is compressed between an outflow-side rim of the filter element and the secondary filter element. By compression, for example, of a flexible sealing material, vibration damping is achieved. For example, the sealing element or the sealing device is a foam seal.

Further possible implementations of the invention comprise also combinations not explicitly mentioned of features or method steps disclosed above or in the following with regard to the embodiments. In this context, a person of skill in the art will also add individual aspects as improvements or supplements to the respective basic form of the filter housing or the filter assembly.

Further embodiments of the invention are subject matter of the dependent claims as well as of the embodiments of the invention disclosed in the following. In the following, the invention will be explained in more detail with the aid of embodiments with reference to the attached Figures.

BRIEF DESCRIPTION OF THE DRAWINGS

FIG. 6A shows a schematic illustration of an embodiment of filter assembly; FIG. 6B shows an end view; and FIG. 6C shows a filter element for use in the filter assembly.

FIG. 7A shows an end view of a filter assembly 105 with two connecting sockets provided on the same side; FIG. 7B shows the filter body of the filter element with cutout; and FIG. 7C shows inserted preseparator in the filter element.

In the drawings, same or functionally the same elements, inasmuch as nothing to the contrary is indicated, are provided with the same reference characters.

DESCRIPTION OF PREFERRED EMBODIMENTS

Figure 1A:
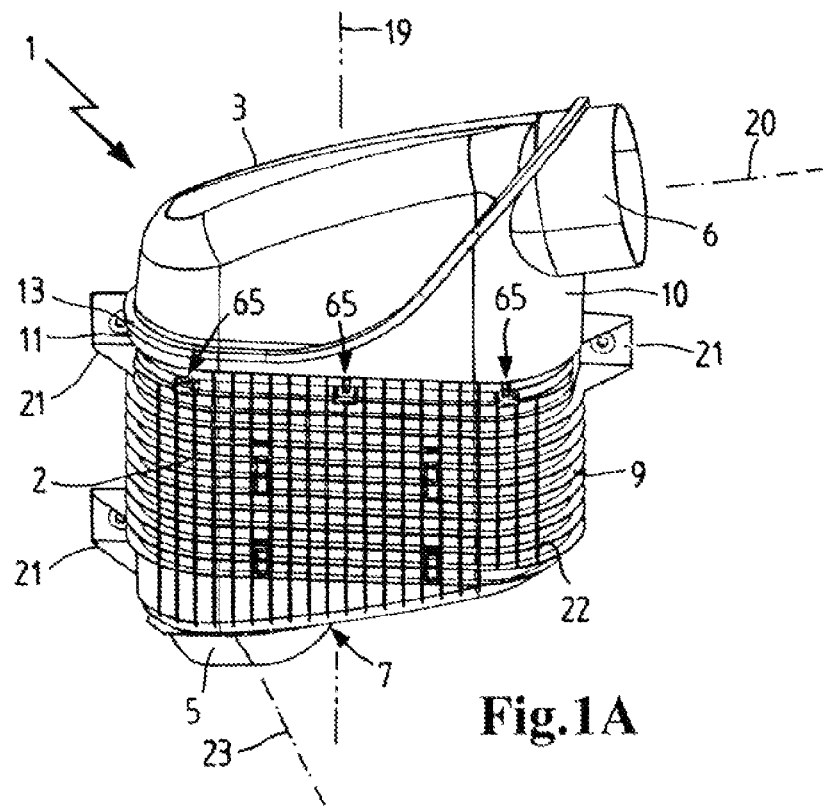
FIG. 1A shows a perspective illustration of an embodiment of a filter housing in the assembled state.
Figure 1B:
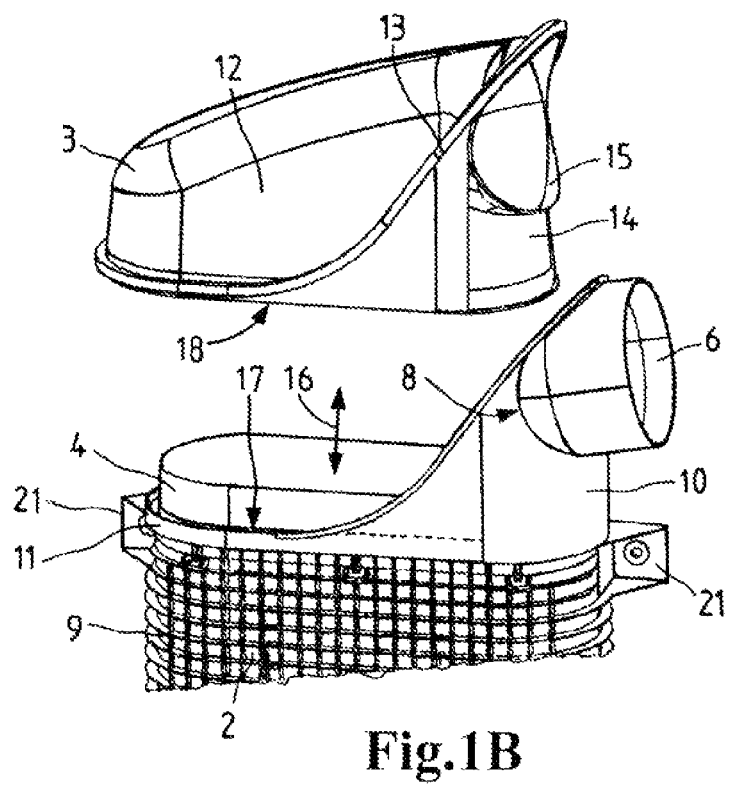
FIG. 1B shows the perspective illustration of FIG. 1A but with the lower housing part and upper housing part spaced apart.

FIG. 1 shows a perspective illustration of an embodiment of a filter housing. FIG. 1A shows in this context the filter housing 1 in the assembled state and FIG. 1B shows the state in which the two housing parts 2, 3 are apart. The filter housing 1 comprises in this context a first lower housing part 2 and a second upper housing part 3. The first housing part 2 can also be referred to as housing bottom part and the upper housing part 3 as cover element. In the following, both terms are being used. One can see in FIG. 1B that a filter element 4, for example, an air filter, is inserted into the lower housing part 2. A possible flow direction of the fluid to be filtered is indicated at 16. Depending on the connections of the filter housing, in the orientation of FIG. 1 fluid or air to be purified flows from top to bottom through the filter element 4 and enters a clean air area.

The filter housing 1 has two connecting sockets 5, 6 that adjoin openings 7, 8 of the first housing part 2 and project away from the housing 1. The connecting sockets 5, 6 each determine a preferred direction 23, 20 relative to the housing 1. The housing bottom part 2 has a body section 9 which substantially surrounds the shape of the filter element 4. The lower housing part 2 has moreover a collar section 10 which in the orientation of FIG. 1 extends laterally upwardly and on which the second laterally projecting connecting socket 6 is integrally formed. Below the body section 9, the second connecting socket 5 projects at a slant away from the housing bottom part 2.

The second housing part or the cover element 3 has a collar section 14 which substantially corresponds with the collar section 10 of the housing bottom part 2. In the collar section 14, a housing opening 15 is provided which corresponds with the housing opening 8 on the housing bottom part 2. The second housing part 3 which is also referred to as cover element has moreover a cover section 12 which in the assembled state forms a volume above the filter element 4 for incoming air. In the area of the sealing plane for the filter element 4, the housing bottom part 2 has a rim 17 extending circumferentially on the inner side. For example, a frame of the filter element 4 can be positioned on the rim 17; this frame is not illustrated here. The rim 17 is circumferentially extending within the lower housing part 2. A lower rim 18 of the second housing part 3 corresponds with the rim 17 of the first housing part 2. In the area of the rims 17, 18 further sealing means can be provided in order to provide a fluid-tight closure between the housing 1 and the filter element 4. Projecting rims 11, 13 are arranged on the collar section 10 as well as at the transition between the collar section 14 and the cover section 12. As shown in FIG. 1A, they extend on each other.

Figure 2:
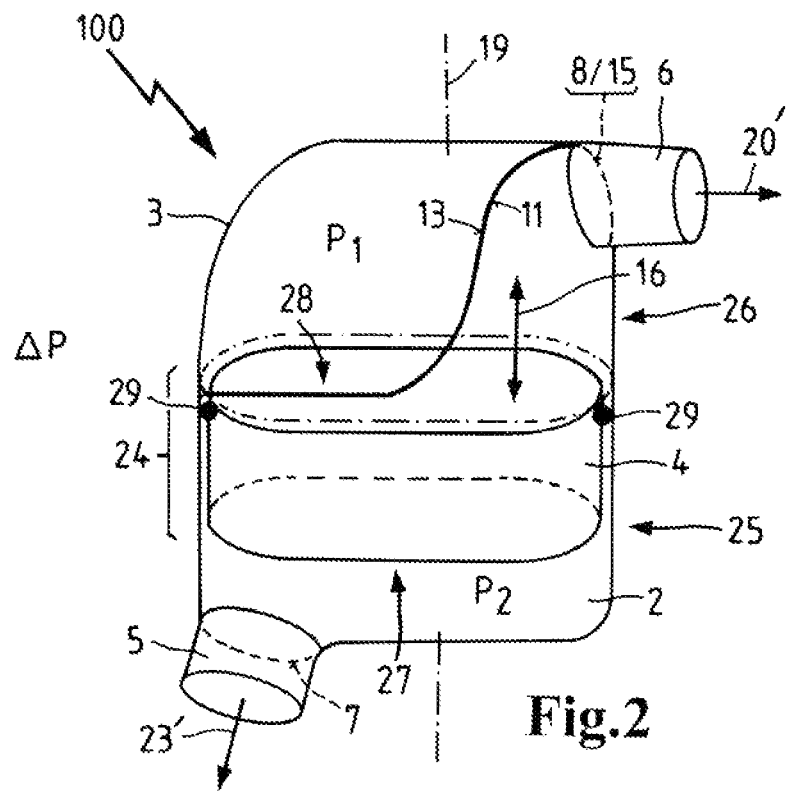
FIG. 2 is a schematic illustration of an embodiment of the filter assembly comprising a filter housing according to FIG. 1.

The two housing parts 2, 3 are secured by means of fastening means 65 on each other. In FIG. 2, for example, detent hooks 65 are indicated which engage, from the cover element 3, engagement sections on the housing bottom part and clamp the two housing parts 2, 3 to each other. In this way, the corresponding frame of the filter element (not illustrated here) is secured fixedly between the rims 17, 18. As fastening means 65 also further implementations are conceivable. For example, the housing parts can be connected by means of screws with each other; also, snap hooks and clips can be used. It is also possible that the housing parts 2, 3 in the rim area are provided with threads or bayonet-like closures so that the housing parts 2, 3 are coupled with each other when turned about the longitudinal direction relative to each other. This is possible in particular in case of housing shapes that have rotational symmetry.

One can see that in particular the connecting socket 6 or the openings 8, 15 upon projection of the filter element 4 along the longitudinal direction 19 are positioned outside of the projection volume. In this way, it is possible to remove the filter element 4 in the longitudinal direction 19 completely out of the housing bottom part 2 when the cover element 3 has been taken off. The filter element 4 is geometrically arranged between the connecting socket 5 or the opening 7 and the connecting socket 6 or the opening 8, 15. Since the two connecting sockets 5, 6, which can be used as inlet and outlet, are provided on one housing part 2, it is not necessary to remove the lines or hoses guided on the connecting sockets 5, 6 upon exchange or filter element replacement. In this way, servicing of a corresponding filter assembly is simplified. On the housing bottom part 2 fastening projections 21 are provided which enable positioning of the filter housing 1 at a suitable location. For the filter housing 1, after attachment by means of the fastening projections 21, for example, in or on a vehicle, stationary positions of the connecting sockets 5, 6 are possible relative to the car body or the motor. In this context it is possible to provide a sprung attachment. Moreover, reinforcement ribs 22 are provided in the body section 9 for reinforcing the housing 1.

The housing parts 2, 3 and in particular the cover element 3 can be designed as disposable parts. An exchange is possible without a supply line or discharge line having to be removed from the connecting sockets 5, 6. It is further possible to integrate a corresponding filter element in the cover element 3 and use it as an individual disposable part.

In the following, further embodiments of filter housing and filter assemblies are schematically illustrated. For reasons of simplicity, the basic principle resides in a housing separation and embodiment that, even when disconnecting the housing parts, enables always a stationary arrangement of the at least two connecting sockets. The embodiments disclosed in the following each comprise individual aspects and modifications that can also be combined with each other in other ways than explicitly explained with the aid of the embodiments.

FIG. 2 shows schematically a filter assembly 100. Two housing parts 2, 3 are provided which are inserted into each other and are resting externally on the projecting rims 11, 13 on each other. In the filter housing which is comprised of the second housing parts 2, 3, a filter element 4 is inserted which is positioned in a receiving area 24 of the lower housing part 2. Laterally, a sealing action 29 relative to the housing wall is realized. On the first housing part 2, the housing bottom part, a first connecting socket 5, pointing to the left and downwardly, is mounted on a housing opening 7 and an upper connecting socket 6, substantially horizontally extending and pointing to the right, is attached to a housing opening 8. The corresponding housing opening 15 in the second housing top part 3 is also illustrated.

The sealing action 29 between the filter element 4 and the housing wall separates a raw air area 26 from a clean air area 25. For example, air to be cleaned flows through the lateral connecting socket 6 as an inlet into the filter housing, flows through the filter element 4, enters the lower clean air area 25, and exits the filter assembly 100 through the connecting socket 5. Accordingly, an operation of the filter assembly 100 is possible in which the lower area is a clean fluid area 25 and the upper area is a raw fluid area 26. Likewise, a reverse flow direction can be implemented. The filter element 4 has accordingly a planar inflow side 28 and a planar outflow side 27 in the illustration of FIG. 2. As a result of the flow resistance of the employed filter medium, a different pressure within the raw air or raw fluid area 26 and the lower clean air or clean fluid area 25 is generated. A pressure difference of pressure $p_1$ to pressure $p_2$ results. This is indicated to the left by $\Delta p$. Possible flow directions are indicated at 16.

A length direction 19 of the filter assembly 100 and of the filter element 4 results, for example, from the direction of pressure drop between the raw air side 28 and the clean air side 27 wherein $p_2 < p_1$. This direction is indicated with dash-dotted line 19. As already explained in regard to FIG. 1A, in FIG. 2 one can see that a projection of the filter element, i.e., the inflow or outflow side 28, 27 along the longitudinal axis 19, does not reach at least one connecting socket 6 or the housing openings 8, 15. The housing opening 8 is positioned here outside of the area that is defined when projecting the surface of the inflow side 28 in upward direction in the orientation of FIG. 2. Also, laterally of the filter element 4, i. e., of the volume between the inflow side 28 and the outflow side 27, none of the housing openings 7, 8, 15 is provided.

The filter element provided in the filter assembly 100 can be, for example, designed as a compact filter element with a filter material that is wound about the longitudinal axis. Conceivable are also folded, pleated filter media that are folded in a star shape and have a single bellows or double bellows geometry. Basically, all conceivable filter media and filter element configurations can be used. Layered, stacked or wound, single-layer or multi-layer flat filter media are to be mentioned only in an exemplary fashion. Likewise, foamed filter media can be used.

Figure 3:
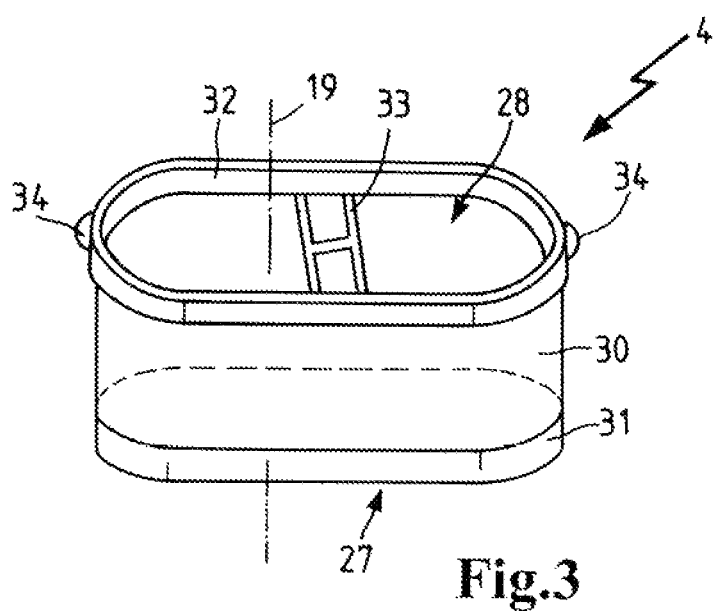
FIG. 3 is a schematic illustration of an embodiment of a filter element for a filter housing according to FIG. 2.

FIG. 3 shows an embodiment of a filter element 4 which is suitable for use in the here illustrated filter assemblies. The filter element comprises a filter body 30 which is manufactured of a suitable filter medium and has suitable retaining properties for dirt for the respective target application. The filter element 4 comprises an inflow side 28 and an outflow side 27 that each form substantially a planar surface. In variants also non-planar curved inflow or outflow sides 28, 27 are conceivable. A frame 32 is provided that circumferentially surrounds the inflow side 28 and, for example, is manufactured of plastic material and imparts stability to the filter element. At the outflow side, a circumferentially surrounding frame 31 can also be provided for holding the filter medium 30.

In the embodiment according to FIG. 3, at the upper holding frame a sealing element 34 is circumferentially applied which acts fluid-tightly relative to the housing wall in the inserted state. At the inflow side, on the holding frame 32 a removal aid 33 is provided. The removal aid enables handling of the filter element 4, in particular pulling out the filter element 4 installed in the housing along the longitudinal axis 19. The removal aid can have, for example, a flow-guiding action in the manner of a deflection or guiding means. For this purpose, for example, along the longitudinal axis, plastic parts with openings are projecting with which the filter element 4 can be gripped.

It is possible that an appropriate grip corresponding to the removal aid 33 or a tool is attached to the second housing part 3. For example, the cover element 3 can comprise on the exterior side an engagement section which is insertable into the removal section 33. In this context, in particular a locking action can occur that makes it possible to pull the filter element 4 out of the lower housing part 2 by means of the cover element 3.

Embodiments of the filter element provide that a removal grip is fastened detachably in or on the filter element 4. A removal grip for a corresponding interaction with the removal aid or the removal element 33 can also be attached or glued in or on the filter element on the filter body 30 since, for removal of a spent filter element, the appropriate removal grip can then be taken off. Alternatively or additionally, a seal and/or removal aid is provided also on the lower frame 31. In principle, filter elements can also comprise a circumferential seal or a frame at any location of their height between the inflow side and the outflow side.

Even though an embodiment of the filter element 4 is indicated in FIG. 3 in an exemplary fashion, the proposed filter assembly can comprise further variants of filter elements. In particular, the use of filter media in filter elements as they are disclosed in WO 2006/012386 is possible. Together with the proposed housing shapes, in particular the stationary arrangement of connecting sockets, an advantageous filter assembly results.

In FIG. 2, the connecting sockets 5, 6 each have a preferred direction 23', 20' which is pointing away from the housing. Relative to the longitudinal direction 19, for example, the upper lateral connecting socket 6 has a preferred direction 20' which substantially is positioned at a right angle relative to the longitudinal direction 19. Therefore, one can speak of a deflecting connecting socket. Air flowing in flow direction 16 through the filter medium or the filter element 4 is deflected by the connecting socket laterally by approximately 90°. Conceivable in this context is an operation of the filter element 100 in which air from the environment enters through the connecting socket 6 into the raw fluid area 26, is deflected, and flows through the filter medium substantially along the lower orientation of arrow 16 through the filter element. The preferred directions 20', 23' can be designed, for example, such that the connecting socket and thus the supply lines are located practically on one side of the housing. It is, for example, possible that the preferred directions 20', 23' are positioned at an angle relative to each other that is smaller than 180°. This means that the preferred directions and thus the connecting sockets are not provided co-linear or axial relative to the housing. The preferred directions 20, 23' are, for example, parallel, i.e., are positioned at an angle of 0° relative to each other when they are provided on the same side of the housing.

Figure 4A:
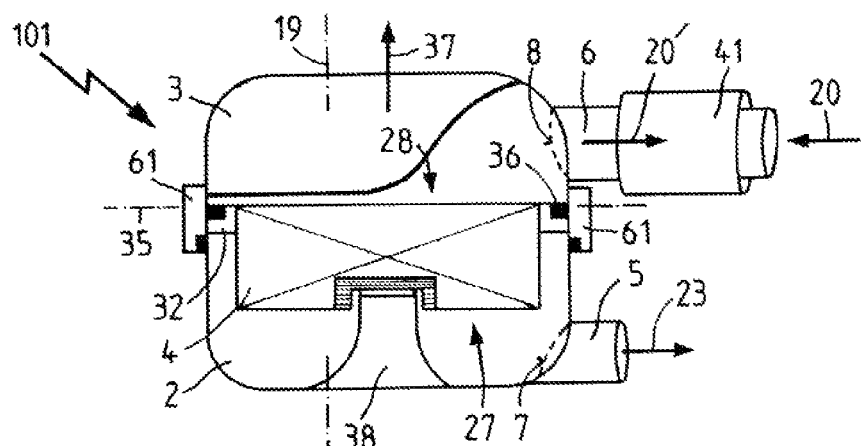
FIG. 4A shows a schematic illustration of an embodiment of a filter assembly and FIG. 4B shows a schematic plan view.
Figure 4B:
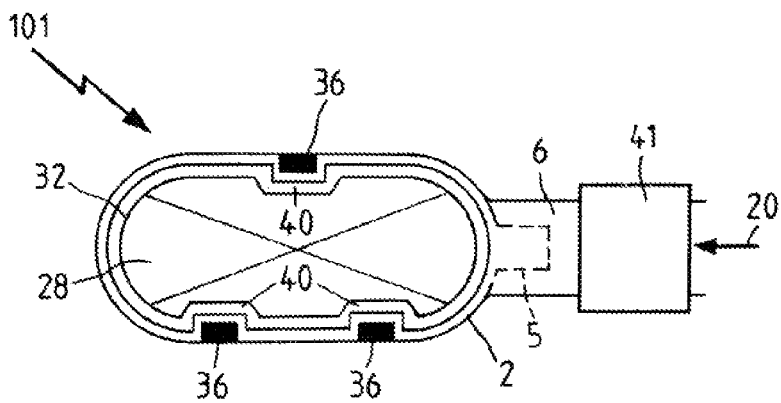

FIG. 4 shows a further embodiment of a filter assembly 101. In FIG. 4, a schematic illustration of the filter assembly 101 with a filter housing 2, 3 and a filter element 4 is illustrated and in FIG. 4B a schematic section view through a sealing plane 35 of the filter assembly 101 that is indicated in FIG. 4A. Again, the filter assembly 101 has a lower housing part 2 and an upper housing part 3. On the lower housing part 2, the two connecting sockets 5, 6 are arranged which, beginning at the housing openings 7, 8, extend in a preferred direction 23', 20. The two preferred directions 20', 23 are parallel to each other. This means that an angle of 0° is provided therebetween, the connecting sockets 5, 6 are thus on the same side—in FIG. 4A to the right of the housing. The term substantially parallel is to be understood as also still including an angle of 10° relative to each other.

In this way, a particularly beneficial connecting situation for supply and discharge lines of the air is possible. The two preferred directions 20', 23 are positioned perpendicular to the longitudinal direction 19.

In the illustration of FIG. 4A, fastening means, for example, clasps or locking noses, 61 for connecting the two housing parts 2, 3 are indicated.

A filter element 4 is provided in the filter assembly 101 which has an inflow side 28 and an outflow side 27. In the filter assembly 101 illustrated in FIG. 4, the air to be filtered flows in inflow direction 20 through the connecting socket 6 into the raw air area above the inflow side 28 of the filter element 4. The outflow direction 23 in the lower area of the housing 2 is identical to the preferred direction of the outflow connecting socket 5. Both connecting sockets are designed as deflecting connecting sockets 5, 6.

Moreover, a preseparation device 41 is coupled to the inlet connecting socket 6. By means of the preseparator 41 already a coarse filtration or separation of coarse dirt particles is enabled. The preseparator 41 is accordingly provided on the inlet socket 6. As a preseparator 41, for example, centrifugal separators or cyclone separators are suitable, but also round filter elements, which are coupled in or on the intake line. The filter assembly 101 comprised of the preseparator 41, the housing 2, 3, as well as the filter element 4 enables, for example, a particularly efficient filtration of intake air in motor vehicles. In FIG. 4, the filter element 4 is provided at the outflow side 27 with a support section 39. A support element 38 engages correspondingly the support section 39 and extends from the housing bottom part 2 in the direction toward the outflow side 27. The support element 38 counteracts the forces resulting from pressure difference of the raw air side 28 relative to the clean air side 27. A deformation of the filter element 4 is thus avoided. The support element 38 engages, for example, as a sword, the filter element 4. Relative to the housing 2, 3, the filter element 4 is sealed in a sealing plane 35. For example, this is provided by the circumferential frame 32 which is inserted between the two housing halves 2, 3 and is clamped there between.

In FIG. 4B, one can see moreover in a cross-section through the sealing plane 35 that positioning elements 36 extend inwardly away from the housing. The circumferential frame 32 of the filter element 4 has corresponding positioning sections 40 engaged by the positioning elements 36. By the arrangement of the positioning elements 36 and of the positioning sections 40, a rotation, for example, of round filter elements, is prevented. Also, unsuited filter elements cannot be inserted into the corresponding housing. By matching the filter element 4, correctly inserted by means of the positioning elements 36 and positioning sections 40, as well as by the connecting socket arrangement lateral to the filter housing, a precise and reliable filtration of air can be achieved. Moreover, by means of the positioning elements 36 and the sections 40 an anti-rotation device is provided.

FIG. 4B shows also how laterally of the housing 2, 3 the preseparating device 41 can be arranged. In the embodiment as indicated in FIG. 4, air flows essentially in a U-shape laterally into the filter housing 2, 3 at the top, flows through the filter medium in longitudinal direction 16 downwardly, and flows, purified, via the deflecting connecting socket 5 out of the filter assembly 101 again.

Figure 5:
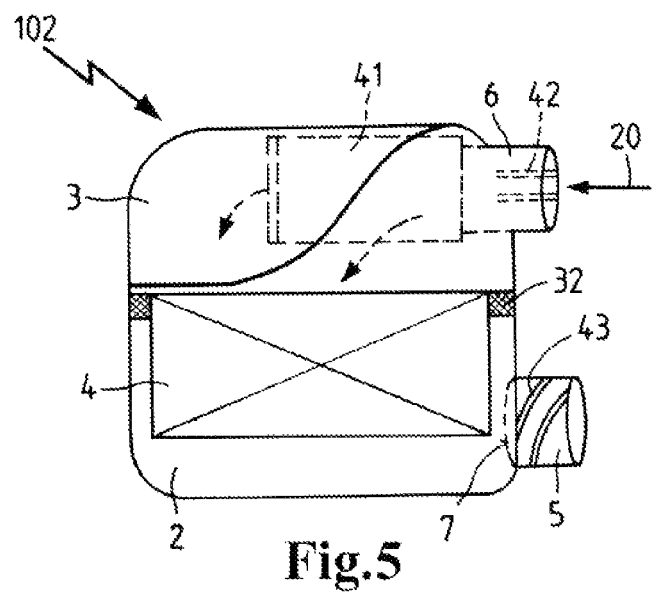
FIG. 5 shows a schematic illustration of another embodiment of a filter assembly.

FIG. 5 shows a variant of a filter assembly 102. The filter assembly 102 comprises the two-part housing 2, 3 with an inserted filter element 4. The connecting socket 6 is configured as an inlet connecting socket for air to be cleaned and the connecting socket 5 as an outlet connecting socket for purified air. The filter assembly 102 comprises an inwardly positioned prefiltering device or a preseparator 41. The preseparator 41 is fastened on the cover element 3 at the inlet socket 6. It is also possible to integrate the prefiltering device 41 into the housing part 3. In this way, as shown in FIG. 5, a particularly compact configuration of the filter assembly results that enables a prefiltration by means of the preseparator 41 as well as fine filtration by means of the filter element 4.

A guiding device 42 is provided on the inner side at the inlet connecting socket 6 in order to achieve a particularly beneficial flow guiding action of the incoming air 20. For example, a kind of guiding apparatus can be integrated in the connecting socket 6 that enables a particularly good preseparation action in the preseparator 41. Moreover, the lower outlet connecting socket 5 is provided with reinforcement ribs 43 in order to achieve increased stability. In principle, both connecting sockets 5, 6 can be provided with reinforcement means such as ribs or other means in order to increase stability.

It is also conceivable that on both connecting sockets 5, 6 for improvement of the flow guiding action air guiding baffles or the like are provided. A preseparation action can be achieved already in that, for example, a round filter element at the inner side of the housing is coupled to the connecting socket 6. This can be done by means of a bayonet coupling, a threaded connection, a sliding seat, clip-on or plug-in. It is also possible to obtain a preseparation by a retaining screen in the connecting socket 6.

FIG. 6 shows a further variant of a filter assembly 104. FIG. 6A shows a schematic section view, FIG. 6B a side view from the direction of the inlet connecting socket, and FIG. 6C a filter element that is suitable for use. The filter assembly 104 has again two housing parts 2, 3, wherein on the housing bottom part 2 a first connecting socket 5 and on the housing top part 3 a second connecting socket 6 is provided. The connecting socket 6 serves as an intake connecting socket for air to be filtered. The connecting socket 5 serves as an outlet connecting socket for filtered air. The preferred directions 20', 23 of the connecting sockets 6, 5 are substantially positioned at a right angle relative to each other.

The sealing plane 35 extends at a slant through the housing 2, 3. The resulting housing division and sealing plane 35 do not coincide in the embodiment according to FIG. 6. In this context, the sealing plane is slanted relative to the longitudinal direction 19. One can see in FIG. 6C that the filter element 4 has an inflow side 28 that is slantedly extending relative to the outflow side 27. The filter body 30 is formed such that the substantially planar inflow side 28 is positioned at an angle 44 relative to the outflow side 27. A fastening frame or holding frame 32 that seals relative to the housing extends therefore also at a slant in the housing. In the view of FIG. 6B laterally in the direction of the inlet connecting socket 6, one can see that the area defined by laterally projecting the filter element 4 (see dashed line) overlaps the cross-section of the connecting socket 6 or the opening 8. Due to the slanted configuration, in the raw fluid area 26 in the housing, there is sufficient space on the one hand to provide a prefiltering device within the housing. On the other hand, due to the inlet and outflow sides 27, 28 being slantedly positioned relative to each other, an increased filter volume or greater filter surface area can be achieved with the filter body 30. As a whole, a particularly beneficial filtration of air can be achieved by means of the filter assembly 104 comprised of the filter housing with appropriately designed rim shape 17, 18 for holding the filter element 4.

In FIG. 7, a further filter assembly 105 with a specially shaped filter element is schematically illustrated. In FIG. 7A, a side view of the filter assembly 105 is illustrated wherein the two connecting sockets 5, 6 are provided on the same side, as indicated in FIGS. 4 and 5, for example. The filter element 4, as schematically indicated in FIG. 7B, has a cutout 45 suitable for receiving a preseparator 41. FIG. 7A shows the filter assembly 105 without inserted preseparator 41 (compare FIG. 7C). The circumferential frame 32 which is pointing in the direction toward the inlet connecting socket 6 is inwardly deformed to be outside of the projection of the connecting socket 6. As can be seen in FIG. 7C, it is possible in this way that a preseparator that is, for example, cylindrical can penetrate at least partially into the area of the filter body 30. Corresponding to the holding frame 32 circumferentially extending about the filter medium 30, the appropriate collars are correspondingly designed (not illustrated) on the housing parts 2, 3. In a similar way, a filter element 4, for example, designed as a main filter element, can be provided also with a cutout for receiving a secondary filter element arranged downstream in flow direction. As a whole, a compact and space-saving filter assembly is provided with the aid of the housing, the filter elements, and optional secondary filter elements and preseparators.

In variants, the secondary filter element 41 can also be received completely in the volume of the main filter element 4.

Figure 8:
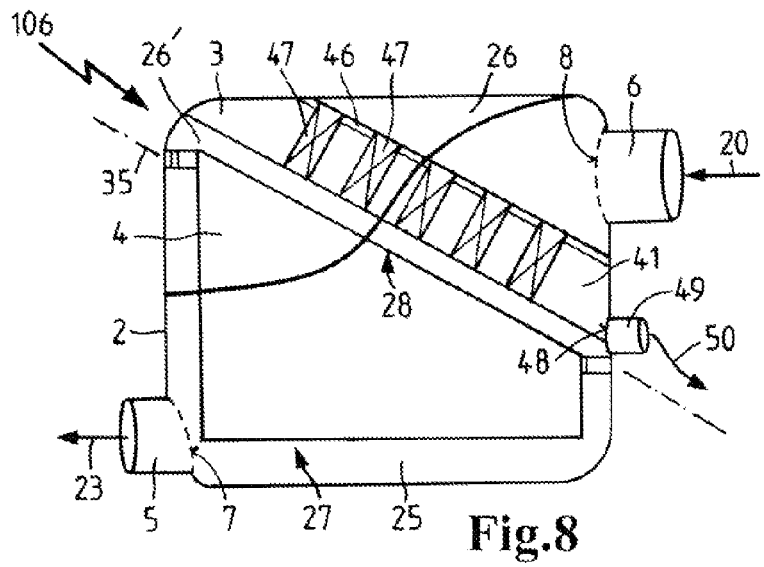
FIG. 8 shows a schematic illustration of a further embodiment of a filter assembly.

In FIG. 8, a further embodiment of a filter assembly 106 is illustrated. The two-part housing has a housing bottom part 2 and a housing top part 3 wherein on the housing bottom part an outlet connecting socket 5 pointing to the left and on the housing top part 3 an inlet connecting socket 6 pointing to the right are provided. The inflow direction of the air is indicated at 20 and the outflow direction at 23.

Moreover, on the first housing bottom part 2, a further connecting socket 49 is provided on a housing opening 48. The slantedly cut filter element 4 is inserted as schematically illustrated, for example, in FIG. 6C. Due to the slanted arrangement, mounting space is available within the upper area of the filter housing for an extended prefilter. Opposite the slanted inflow side of the filter element 4, a prefilter assembly 41 with centrifugal separators is provided. Several centrifugal separators or cyclone separators can be arranged on a support plate 46. The cyclone separators which comprise substantially cylindrical tubes with guiding apparatus, are illustrated at 47. The only schematically indicated cyclone separators 47 carry out preseparation so that coarse dust particles can no longer reach an intermediate space 26' but fall to the right in downward direction as a result of gravity and the slanted arrangement, as shown in FIG. 8. Through the opening 48 and the discharge socket 49 the preseparated dust material 50 can be removed from the flow path. Accordingly, a particularly compact configuration of a filter assembly 106 is thus obtained with which a particularly good filtration is realized with an efficient multi-cyclone block preseparator 46, 47 and, for example, a compact filter element 4.

Figure 9:
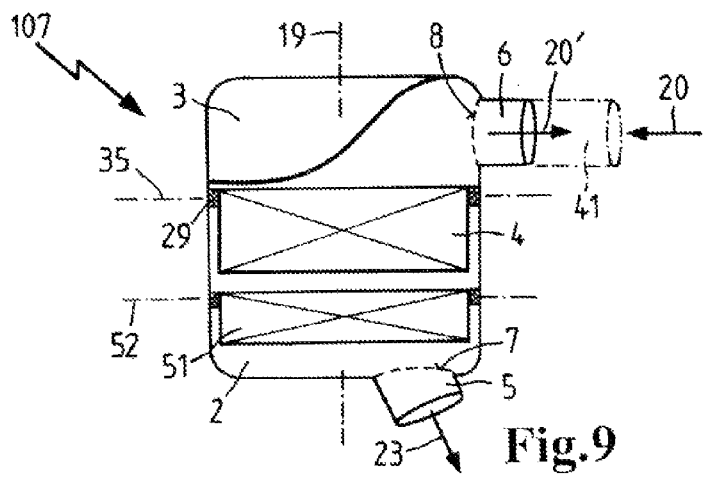
FIG. 9 shows a schematic illustration of yet another embodiment of a filter assembly.

FIG. 9 shows a further filter assembly 107 in which a two-part filter housing 2, 3 is furnished with a main filter element 4 and a secondary filter element 51. On one housing part 2 again an inlet connecting socket 6 and an outlet connecting socket 5 are provided that each have a preferred direction 20', 23. Optionally, in or on the inlet connecting socket 6 a prefiltration device 41 is provided. Upon passage substantially along the longitudinal direction 19, the air to be filtered reaches the upper area of the housing 3 after preseparation in the preseparator 41, passes through the main filter element 4, and is subsequently purified further in a secondary filter element 51.

Between the housing 2, 3 and the main filter element 4, a sealing surface 35 is provided wherein a suitable sealing action 21 is realized. A second sealing plane 52 results below the main filter element 4 on a frame of the secondary filter element 51. The secondary filter element 51 can realize a finer, the same, or even a more coarse filtration in comparison to the main filter element 4. In principle, for the filter elements 4, 51, the same or similar filter materials are conceivable. One obtains by means of the filter assembly 107 insofar a stepped filtration: first a coarse separation by means of the pre-separator 41 and a main separation by means of the filter element 4. The secondary filter element 51 can be used as a safety element. For example, should the filter element 4 not operate properly, be damaged or not installed, the secondary element 51 can still provide a certain filtering function so that still sufficiently purified air can be delivered by the filter assembly 107.

Both filter elements, the main filter element 4 and the secondary filter element 51, can be removed for exchange simply by taking off the housing top part 3 along the longitudinal axis 19. It is in particular possible that the main and/or the secondary filter element 4, 51 is detachably or fixedly connected to the housing cover 3. The element 4, for example, is attached by a sliding seat, screws, a bayonet closure, clip-on or plug-in. Accordingly, the dirt or dust that has accumulated upon use on the inflow side of the filter element 4 cannot also soil the secondary element 51 because no dust can fall into the lower area upon removal along the longitudinal direction 19.

Figure 10:
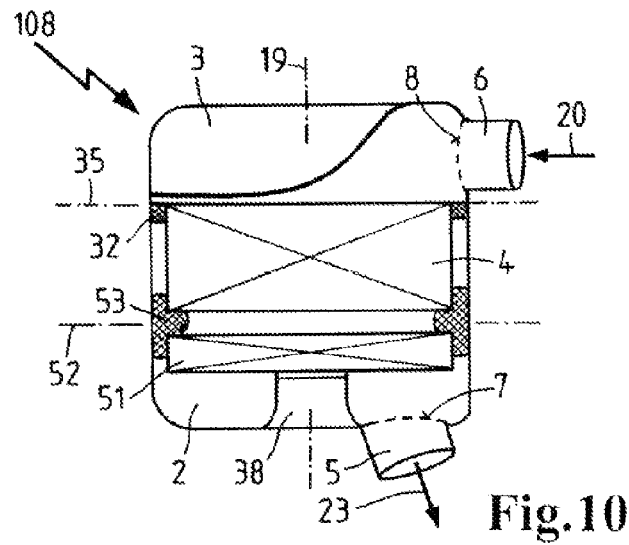
FIG. 10 shows a schematic illustration of a variant of a filter assembly.

FIG. 10 shows a further embodiment of a filter assembly 108 with a secondary filter element 51 and a main filter element 4 with an upper holding frame 32 which extends along an upper sealing plane 35. The filter assembly 108 comprises again a two-part housing 2, 3 with an inlet connecting socket 6 on a housing opening 8 and an outlet connecting socket 5 on a housing opening 7. The respective inflow direction is identified at 20 and the outflow direction of purified air at 23.

The housing bottom part 2 comprises a support element 38 which extends in direction toward the outflow side of the secondary filter element 51 and supports the latter. For example, a corresponding engagement for the support element 38 is provided in the secondary filter element 51. Upon insertion, the secondary filter element 51 can be supported on the support element 38.

Moreover, a flexible sealing element 53 at the rim or at the transition to the main filter element 4 is provided. This results in a lower sealing plane 52 in order to prevent flow of the fluid purified by the main filter element 4 laterally past the secondary filter element. Accordingly, for example, by means of a bottom side frame on the main filter element 4, a pressing action or compression of the preferably flexible sealing element 53 is provided. The sealing element 53 can comprise, for example, a foam seal which is provided on the housing or also on the secondary or main filter element 4, 51. By the pressing action, a vibration damping is achieved. Finally, the main filter element 4 is sealed on its circumferentially extending frame 32 relative to the inner housing wall in the sealing plane 35.

Figure 11:
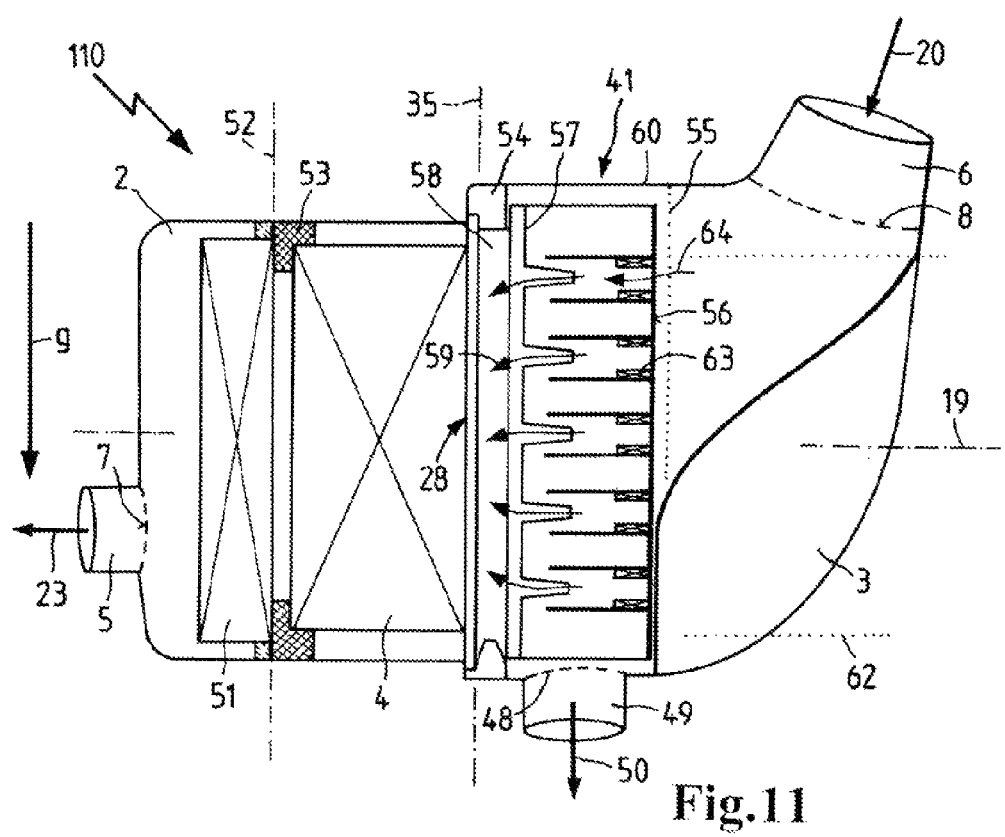
FIG. 11 shows a filter assembly comprising three housing parts.

FIG. 11 shows yet another filter assembly 110. The filter assembly 110 comprises three housing parts 2, 3, and 60. The filter assembly 110 shown in FIG. 11 is provided with a preseparator 41, a main filter element 4, and a secondary filter element 51. In the orientation of FIG. 11, the housing bottom part 2 is provided laterally to the left. A longitudinal direction 19 of the filter assembly extends horizontally. The outlet connecting socket 5 is oriented to the left along the longitudinal direction 19. The inlet connecting socket 6 is designed as a deflecting connecting socket so that the incoming air, along the inflow direction 20, is deflected—in the orientation of FIG. 11 to the left—first in direction of the longitudinal direction 19 in flow direction. The inflow connecting socket 6 or the corresponding housing opening 8 is positioned outside of a projection 62 of the main filter element 4 along the longitudinal direction 19. The projection is indicated in dotted lines at 62.

Between the first housing bottom part 2 and the cover element 3, an intermediate housing part 60 is provided which is furnished with a cyclone separator assembly. The intermediate housing part 60 enables prefiltration. The dotted line 55 shows the division of the housing. Moreover, a further third connecting socket 49 is provided on the housing opening 48 of the housing bottom part 2. A corresponding housing opening 48 is provided in the intermediate housing part 60. All connecting sockets of the filter assembly 110, i.e., the discharge connecting socket 5, the inflow connecting socket 6, and the discharge connecting socket 49, are stationary and must not be displaced upon exchange of the filter elements 4, 51. It is also possible to provide the intermediate housing part 60 with its own connecting socket that is not stationary.

The preseparating device 41 of the intermediate housing part 60 comprises a cyclone separator plate 56 on which guiding apparatus 63 of centrifugal separators are mounted. Opposite the cyclone separator plate 56 an immersion pipe plate 57 is provided with cyclone immersion pipes that engage the cyclone separators. Through the immersion pipes, pre-purified air 59 can flow into the intermediate space 58 in the direction toward a main filter element 4. The air to be cleaned flows in inflow direction 20 into the right cover-like housing part 3, passes through the guiding apparatus 63, as indicated by arrow 64, and reaches the intermediate space 58. Subsequently, flow through the main filter element 4 and the secondary filter element 51 occurs. Finally, purified air exits from the outflow socket 5 in the outflow direction 23 out of the filter assembly 110.

Dust particles are separated due to centrifugal forces in the centrifugal separators 63 of the preseparator 51 and fall in the direction of gravity g in downward direction. The separated dust particles collect in the area of the discharge socket 49 where the dust 50 can be removed (indicated by the arrow). For this purpose, for example, a cover or another closure is connected to the dust discharge socket 49. Moreover, a suction device, not illustrated here, can be coupled to the discharge socket 49 in order to remove actively the separated dust particles. The cyclone separators can be designed as active or passive cyclones. In case of active cyclone separators energy introduction is provided, for example, by air suction, a blower, or pneumatic means. It is possible to provide freely discharging cyclones as well as an embodiment in which underpressure is applied to the discharge socket 49. The centrifugal separators or cyclone separators can be furnished with swirl recovery so that only a minimal pressure loss occurs as the air to be purified passes through.

In the filter assembly 110, a sealing plane 52 between the secondary filter element 51 and the main filter element 4 is provided which can be realized by means of a flexible seal. A second sealing plane 35 is provided at the inlet or inflow side 28 of the main filter element 4 wherein a sealing device 54 seals relative to the housing.

Moreover, in particular the cyclone separator plate 56 is fluid-tight and interrupted only by the cyclone elements 63. Insofar, a precisely stepped filtration of air or of other fluids is enabled wherein as a result of the selected housing division and embodiment an easy removal of spent filter elements 4, 51 or preseparators is possible.

The herein illustrated embodiments and aspects of the filter assembly, of the filter element as well as of the housing parts can be modified. Individual aspects indicated in regard to the embodiments can also be combined in filter assemblies which are not explicitly illustrated in the Figures. Known filter materials such as nonwoven, paper, foam or fabric or screen filters are conceivable as filter medium. The secondary and main filter elements can comprise folded, wound or compressed filter media and are matched to the given operating conditions with regard to their retention properties. As filter materials fiberglass media, synthetic fibers, cellulose, nonwovens and the like should be mentioned. Also, paper or precoat filter media are conceivable.

The disclosed filter assemblies can be used as filters for motor vehicles, construction and agricultural machines, trucks, track vehicles that are operated by internal combustion engines. Also configurations of the filter assembly and of the filter housing are conceivable that are configured for stationary large engines, for generators for energy generation, on ships or in rail vehicles. Moreover, embodiments and aspects of the filter assembly, of the filter element as well as of the housing parts can be used in vehicles with fuel cells.

While specific embodiments of the invention have been shown and described in detail to illustrate the inventive principles, it will be understood that the invention may be embodied otherwise without departing from such principles.

What is claimed is:

1. A filter housing for receiving a filter element, the filter housing comprising:
   a two part housing having
      a first housing part; and
      a second housing part;
         wherein one of the housing parts is a cover removably secured onto a remaining one of the housing parts;
   wherein the first housing part having two flow openings: an inflow opening and an outflow opening;
   a first connecting socket arranged on one of the inflow or the outflow openings of the first housing part;
   a second connecting socket arranged on a remaining one of the inflow or the outflow openings of the first housing part;
   a receiving space provided in an interior of the filter housing between the first and second housing openings, wherein the receiving space is configured to receive the filter element;
   wherein at least one of the first housing part and the second housing part includes a support element formed as an inward projecting member projecting inwardly from an interior wall of the housing into an interior of the housing and extending towards an outflow face of the filter element to supportively engage against the outflow face of the filter element;
   flow guiding elements mounted in or directly onto at least one of the first and second connecting sockets;
   wherein the flow guiding elements are flow guiding baffle plates.

2. The filter housing according to claim 1, wherein one of the inflow and outflow openings or one of the first and second connecting sockets is arranged so as to be located at least partially outside of an area defined by projecting the filter element in a direction of a longitudinal direction of the filter element;
   wherein one of the inflow and outflow openings or one of the first and second connecting sockets is arranged so as to be located at least partially outside of an area defined by laterally projecting the filter element.

3. The filter housing according to claim 1, wherein the first housing part is configured such that the filter element, from an inserted position in the filter housing, is guided completely along a central longitudinal direction of the filter element when removing the filter element out of the receiving area of the filter housing.

4. The filter housing according to claim 1, wherein the first connecting socket has a first preferred direction pointing away from the inflow opening and the second connecting socket has a second preferred direction pointing away from the outflow opening;
   wherein the first and second preferred directions are positioned at an angle of greater than 0° and less than 180° relative to each other.

5. The filter housing according to claim 3, wherein the first connecting socket has a first preferred direction pointing away from the inflow opening and the second connecting socket has a second preferred direction pointing away from the outflow opening;
   wherein the first and second preferred directions are substantially pointing in the same direction.

6. The filter housing according to claim 1, wherein at least one of the first and second connecting sockets comprises reinforcement elements arranged on an interior of the connecting socket, the reinforcement elements selected from the group consisting of reinforcement ribs, metal inserts, metal-reinforced sections, fiberglass-reinforced sections, and reinforcement inserts.

7. The filter housing according to claim 1, wherein the flow guiding elements are flow guiding baffle plates arranged in an interior of at least one of the first and second connecting sockets.

8. The filter housing according to claim 1, wherein the second housing part further comprises a dust discharge opening that aligns with and abuts with the inflow opening of the first housing part.

9. The filter housing according to claim 1, comprising a sealing plane where the filter element, when installed, seals to the housing, separating a raw fluid area from a clean fluid area of an interior of the filter housing;
   wherein at least one of the first and second housing parts comprises positioning elements arranged in an area where the sealing plane is located and configured to engage into recesses in a seal frame of the filter element to position the filter element in the filter housing.

10. The filter housing according to claim 1, wherein the filter element comprises a filter body and a holding frame circumferentially extending about the filter body at an inflow side of the filter element;
    wherein the filter element is integrated into the first housing part or the second housing part and the holding frame has a seal that seals to the housing along a seal plane.

11. The filter housing according to claim 1, wherein the filter element comprises a support section at an outflow face of the filter element and wherein at least one of the first housing part and the second housing part comprises a support element engages the support section on the outflow face of the filter element.

12. The filter housing according to claim 1, wherein the second housing part has a preseparating device mounted in or on one of the first and second connecting sockets or mounted in or on one of the first and second housing parts.

13. The filter housing according to claim 1, further comprising
a third housing part arranged between the first and second housing parts and configured to receive a filter device.

14. A filter assembly comprising:
a filter housing comprising:
a first housing part; and
a second housing part;
wherein one of the housing parts is a cover removably secured onto a remaining one of the housing parts;
wherein the first housing part having two flow openings: an inflow opening and an outflow opening;
a first connecting socket arranged on the inflow opening of the first housing part;
a second connecting socket arranged on the outflow opening of the first housing part;
a receiving space provided in an interior of the filter housing between the inflow and outflow openings,
a main filter element;
wherein the receiving space is configured to receive the main filter element;
the main filter element mounted in the receiving space of the filter housing and separating a raw fluid area from a clean fluid area in the filter housing;
a cylindrical preseparator arranged within an interior of the filter housing above an inflow face of the main filter element, the cylindrical preseparator connected to the inflow opening of the first housing part;
wherein the main filter element comprises
a filter body provided with a cutout recess formed in the inflow face of the filter body;
wherein the cylindrical preseparator is accommodated at least partially within the cutout recess.

15. The filter assembly according to claim 14, wherein the main filter element is arranged in and detachably fastened to the second housing part of the filter housing.

16. The filter assembly according to claim 14, wherein the first housing part of the filter housing comprises
a dust discharge opening and
a third connecting socket arranged on the dust discharge opening.

17. The filter assembly according to claim 14, wherein the filter housing comprises at least one support element and the main filter element comprises a support section configured to interact with the support element.

18. The filter assembly according to claim 14, wherein the filter housing comprises
a sealing plane where the raw fluid area and the clean fluid area are separated from each other in an interior of the filter housing;
wherein the filter housing comprises
positioning elements in an area where the sealing plane is located; and
wherein the main filter element comprises
positioning sections interacting with the positioning elements.

19. The filter assembly according to claim 14, wherein the main filter element has an inflow face and an outflow face,
wherein the inflow face is slanted relative to the outflow face.

20. The filter assembly according to claim 14, further comprising
a secondary filter element,
wherein the main filter element comprises
a filter body provided with a second cutout recess and
wherein the secondary filter element is accommodated at least partially in the second cutout recess;
wherein the secondary filter element arranged downstream of the main filter element.

21. The filter assembly according to claim 20, wherein the main filter element and the secondary filter element are fastened to each other.

22. The filter assembly according to claim 20, further comprising
a sealing element sealing fluid-tightly the secondary filter element relative to an inner housing wall of the filter housing;
wherein the sealing element is compressed between a rim of an outflow side of the main filter element and the secondary filter element.

23. The filter assembly according to claim 22, wherein the sealing element comprises a foam seal.

* * * * *